US011258582B2

(12) United States Patent
Ramachandran et al.

(10) Patent No.: US 11,258,582 B2
(45) Date of Patent: Feb. 22, 2022

(54) DISTRIBUTED SYSTEM AND METHOD FOR ENCRYPTION OF BLOCKCHAIN PAYLOADS

(71) Applicant: QBRICS, INC., Colorado Springs, CO (US)

(72) Inventors: Rakesh Ramachandran, Kerala (IN); Rajiv Chandran, Jharkand (IN); Brennan Bennett, Park City, UT (US)

(73) Assignee: QBRICS, INC., Colorado Springs, CO (US)

( * ) Notice: Subject to any disclaimer, the term of this patent is extended or adjusted under 35 U.S.C. 154(b) by 495 days.

(21) Appl. No.: 15/968,470

(22) Filed: May 1, 2018

(65) Prior Publication Data

US 2018/0316492 A1    Nov. 1, 2018

Related U.S. Application Data

(60) Provisional application No. 62/492,436, filed on May 1, 2017.

(51) Int. Cl.
*H04L 9/06* (2006.01)
*H04L 9/08* (2006.01)
(Continued)

(52) U.S. Cl.
CPC .......... *H04L 9/0637* (2013.01); *H04L 9/0631* (2013.01); *H04L 9/085* (2013.01);
(Continued)

(58) Field of Classification Search
CPC . H04L 9/0637; H04L 9/3239; H04L 63/0428; H04L 9/0838; H04L 9/0631; H04L 9/0869; H04L 9/085; H04L 2209/38
See application file for complete search history.

(56) References Cited

U.S. PATENT DOCUMENTS 8,245,050 B1 * 8/2012 Subramanian ...... H04L 67/1097
713/183
9,294,444 B2 * 3/2016 O'Hare ............... H04L 63/0428
(Continued)

OTHER PUBLICATIONS

Weizhi Meng et al., "When Intrusion Detection Meets Blockchain Technology: A Review," IEEE Access, Mar. 15, 2018, pp. 10179-10188. (Year: 2018).*
(Continued)

*Primary Examiner* — Luu T Pham
*Assistant Examiner* — Canh Le
(74) *Attorney, Agent, or Firm* — Jake M. Gipson; Bradley Arant Boult Cummings LLP

(57) ABSTRACT

Distributed systems and methods for encrypting data on a blockchain network are disclosed. One system comprises at least one injector coupled to a node on the blockchain, a controller coupled to the injector, and a generator coupled to the controller. The injector intercepts messages bound for the blockchain and encrypts data in the messages using encryption information received from the controller. The controller acquires encryption information from the generator, which generates encryption keys and derives encryption information from those encryption keys. The encryption information may be divided into multiple parts and distributed between a plurality of injectors. As a result, to assemble an encryption key for encrypting or decrypting data, an injector may have to cooperate with other injectors to acquire sufficient encryption information to re-assemble the encryption key. Thereafter, once encryption information has been distributed, the system may function without further involvement of the controller or generator.

15 Claims, 8 Drawing Sheets

(51) Int. Cl.
*H04L 9/32* (2006.01)
*H04L 29/06* (2006.01)

(52) U.S. Cl.
CPC .......... *H04L 9/0838* (2013.01); *H04L 9/0869* (2013.01); *H04L 9/3239* (2013.01); *H04L 63/0428* (2013.01); *H04L 2209/38* (2013.01)

(56) References Cited

U.S. PATENT DOCUMENTS

| | | | | |
|---|---|---|---|---|
| 2010/0054458 A1* | 3/2010 | Schneider | ................. | H04L 9/14 380/28 |
| 2013/0010966 A1* | 1/2013 | Li | ........................ | H04L 9/085 380/278 |
| 2014/0108726 A1* | 4/2014 | Laurich | ............... | H04L 67/1097 711/114 |
| 2016/0012465 A1 | 1/2016 | Sharp | | |
| 2016/0217532 A1 | 7/2016 | Slavin | | |
| 2016/0292672 A1 | 10/2016 | Fay et al. | | |
| 2016/0342989 A1 | 11/2016 | Davis | | |
| 2016/0342994 A1 | 11/2016 | Davis | | |
| 2017/0011460 A1 | 1/2017 | Molinari et al. | | |
| 2017/0026349 A1* | 1/2017 | Smith | ................. | H04L 63/0428 |
| 2018/0091524 A1* | 3/2018 | Setty | .................... | H04L 9/0643 |
| 2018/0241565 A1* | 8/2018 | Paolini-Subramanya | ................... | H04L 63/123 |
| 2018/0253539 A1* | 9/2018 | Minter | ................ | H04W 12/069 |
| 2018/0276745 A1* | 9/2018 | Paolini-Subramanya | ................... | G06Q 40/025 |
| 2019/0188086 A1* | 6/2019 | Maeda | ................ | G06F 11/1453 |

OTHER PUBLICATIONS

Jay Kishigami, "The Blockchain-based Digital Content Distribution System," IEEE, 2015, pp. 187-190. (Year: 2015).*
National Institute of Standards and Technology "Specification for the Advanced Encryption Standard" FIPS PUB 197, 2001; pp. 1-51.
Daemen, Joan, et al. "AES Proposal: Rijndael" Mar. 9, 1999; pp. 1-47.
Hoffstein, Jeffrey, et al. "NTRU: A Ring-Based Public Key Cryptosystem" Lecture Notes in Computer Science 267-88 (1998) pp. 1-22.
Singer, Ari "NTRU Cipher Suites for TLS" Internet Engineering Task Force, Jul. 3, 2001; pp. 1-19.
Krovetz, Ted, et al. "Message Authentication on 64-bit Architectures" 2006 Cryptology ePrint Archive 37 (2006); pp. 1-11.
Krovetz, Ted "Message Authentication on 64-bit Architectures" Selected Areas in Cryptography (2006); pp. 1-15.
Krovetz, Ted "VMAC: Message Authentication Code using Universal Hashing" CFRG Working Group; Internet Draft, Expires Oct. 2007; Apr. 2007; pp. 1-20.
Nguyen, Hien Ba "An Overview of the NTRU Cryptographic System" Thesis Presented to the Faculty of San Diego State University in partial fulfillment of the requirements for the Degree Master of Arts in Mathematics (2014); pp. 1-49.
Github—Open Source NTRU Public Key Cryptography Algorithm and Reference Code; available at https://github.com/NTRUOpenSourceProject/ntru-crypto; pp. 1-5.
Github—wolfSSL (formerly CyaSSL) is a small, fast, portable implementation of TLS/SSL for embedded devices to the cloud; available at https://github.com/wolfSSL/wolfssl; pp. 1-6.

* cited by examiner

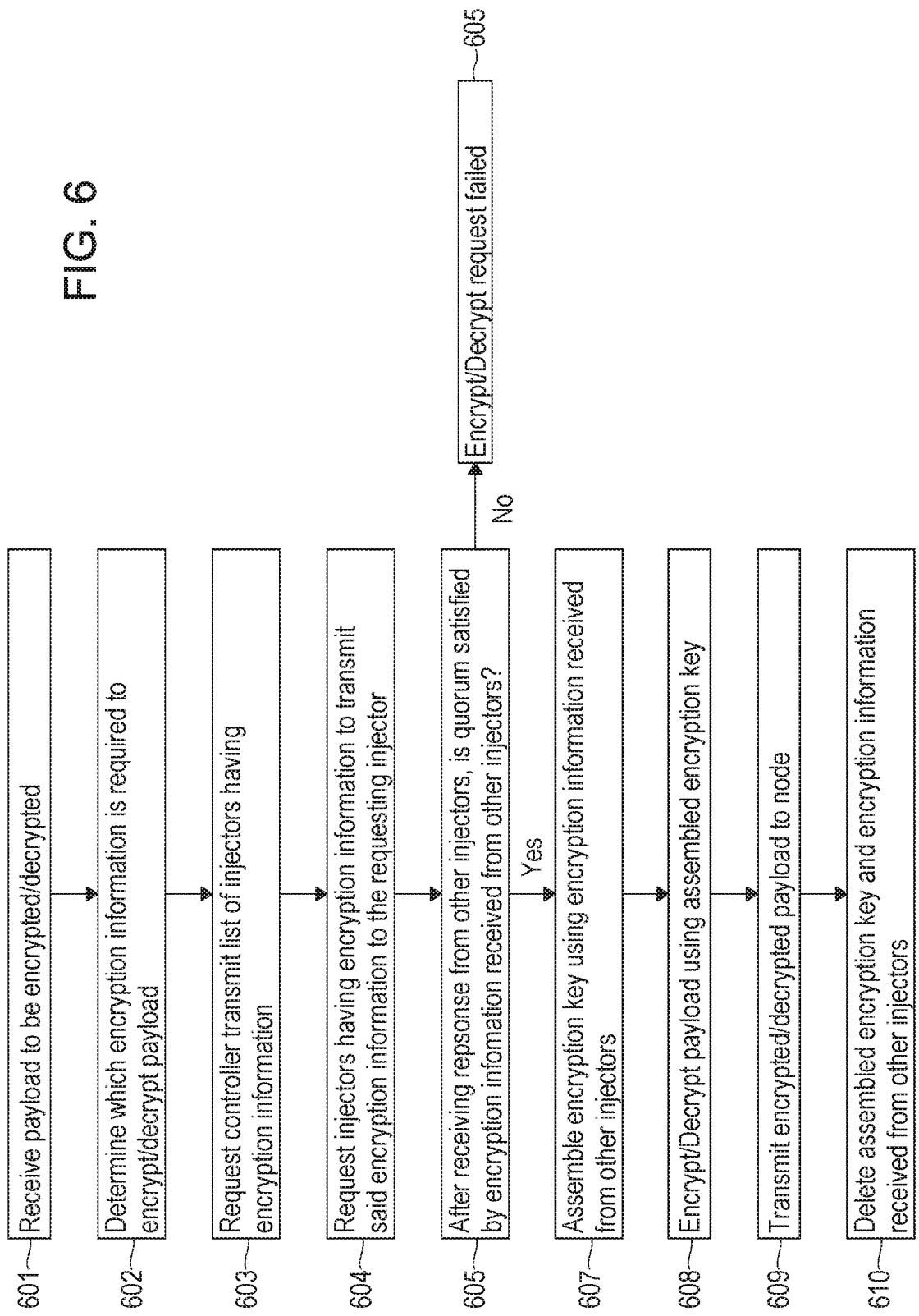

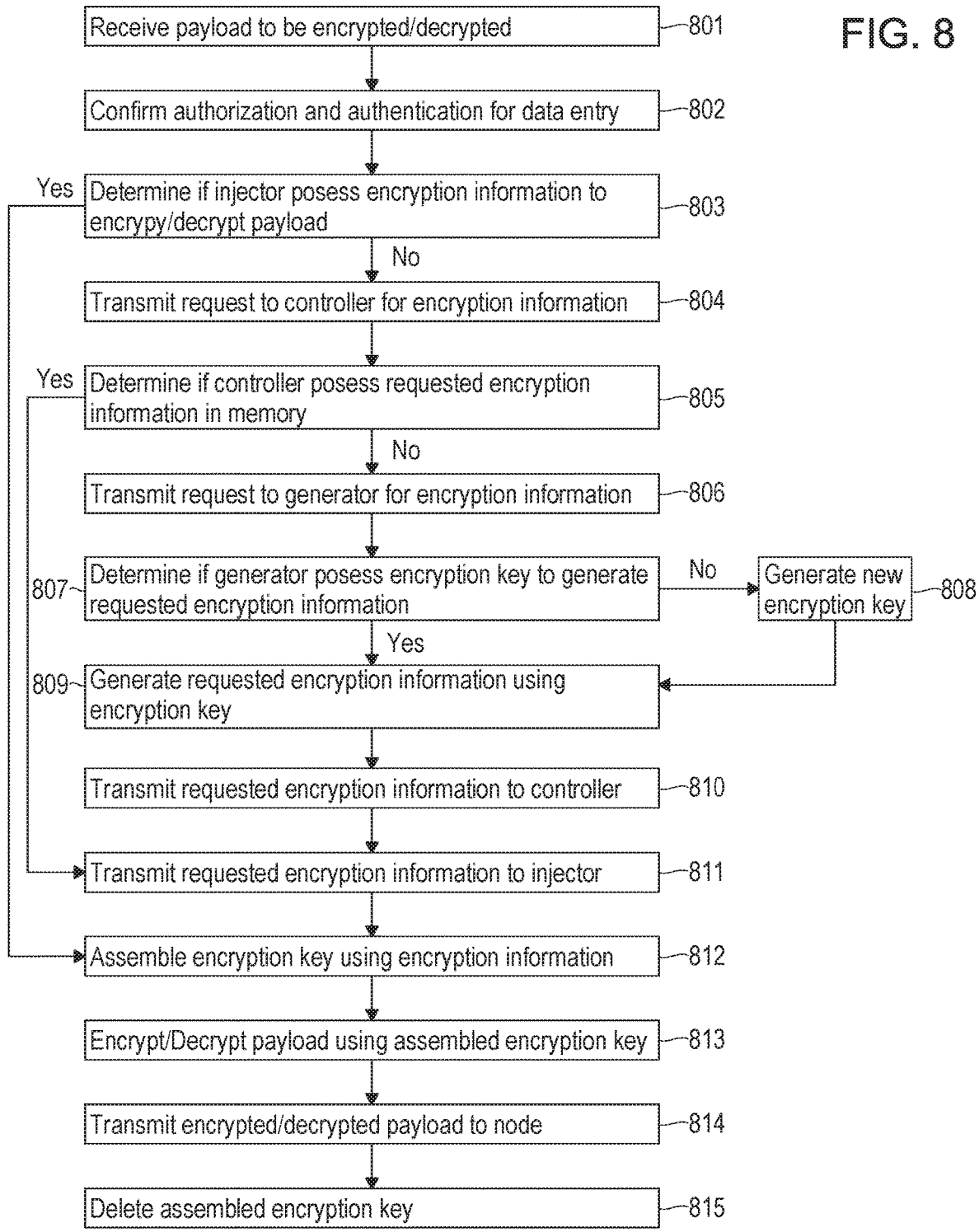

DISTRIBUTED SYSTEM AND METHOD FOR ENCRYPTION OF BLOCKCHAIN PAYLOADS

CROSS REFERENCE TO RELATED APPLICATIONS

This application claims the benefit of and priority to U.S. Provisional Application No. 62/492,436, filed on May 1, 2017, and entitled "Independent Distributed System for Encrypting Payloads Inbound for Blockchains."

FIELD OF THE DISCLOSURE

The present disclosure relates to blockchain technology, and more particularly to systems for encrypting data stored on blockchains.

BACKGROUND OF THE INVENTION

Blockchain technology is becoming increasingly popular and important. In general terms, blockchain refers to databases that are characterized by being distributed ledgers that record transactions between two or more parties. As new transactions are entered into the database, the transactions are entered into the blockchain by adding new blocks of data that contain the data for those transactions. Each new block is tied to the previous block in the chain. The distributed and open nature of the blockchain means that copies of the database (e.g. the validated chain of blocks) are usually stored at multiple nodes in the network. The nodes employ various protocols to cooperate amongst each other as they validate subsequent transactions, add new blocks to the blockchains, and reach consensus on the proper chain of blocks.

The distributed nature of blockchain has numerous advantages. Among those, blockchains record data in an open and verifiable manner. That is, in many instances all participants in the blockchain have access to the data and can verify its accuracy. Further, once transaction data is added to a block in the chain, it is difficult to retroactively remove or modify the data in the block without collusion among a majority of participants in the network. And this security increases over time. As more and more blocks are added to the chain, it becomes increasingly difficult for earlier blocks in the chain to be modified due to the dependency of later blocks.

The decentralized nature of blockchain has other advantages too. No node is more important than another node, so the nodes must cooperate to reach a consensus about the contents of the blockchain. These features require the nodes to be self-sufficient. That is, the nodes generally do not rely upon a higher level system or parent to control operation of the blockchain. This feature increases the resiliency of the network. Because the functioning of the network does not rely upon a main server or computer, the network cannot be rendered inoperable merely by one system being down. Instead, the network can continue to function despite even multiple network outages. So long as at least some nodes in the network remain operable, the network can continue to function notwithstanding the outages.

The numerous advantages associated with blockchain have led to an explosion in applications that employ blockchain technology. The most commonly known application of blockchain is for crypto currency, with Bitcoin being a ubiquitous example. Numerous other types of crypto currency are now also available, with each using different varieties of blockchain technology.

Blockchain's usefulness is not limited to crypto currencies, however. Blockchain may be advantageously employed in instances where a series of events or transactions must be accurately and verifiably recorded. Potential applications include various types of business record management activities, such as contract management, identity management, transaction processing, supply chain management and tracking, inventory management, and medical records maintenance. Blockchain may also be used for non-transactive storage where information is only appended to a database, such as to provide time stamping or notarization.

Depending on the type of application, the blockchain may be a public blockchain, permissioned blockchain, or a private blockchain A public blockchain refers to a blockchain where anyone can be a user or operate a node in the network. Bitcoin is an example. In many cases, users on a public blockchain are anonymous. A permissioned blockchain is one where known entities operate a blockchain network together. Each entity must have the appropriate permissions to participate in the network or to operate a node. Generally, the participants in the permissioned blockchain are able to identify the other participants and read their data stored on the blockchain. A private blockchain is a blockchain operated by just one entity.

A common theme in each type of blockchain is that all participants in the network may access the data stored on the blockchain. So for example where a collection of three or more businesses (or business units) cooperate to operate a permissioned blockchain, all participants may view the data associated with a particular transaction even though the transaction may concern only two of the participants in the network.

The public availability of data in a blockchain results in various concerns that can limit an organization's willingness to adopt or participate in a blockchain network. For instance, there is ordinarily no confidentiality of data. Thus, even though a transaction may concern only two participants in the network, a third party with no vested interest in the transaction may be able to view and make use of the data. As a consequence, particularly where competitors of the business also may participate in the blockchain, business entities may be reluctant to participate in a blockchain. That reluctance hinders widespread adoption of blockchain networks.

Additionally, the storage of sensitive data on blockchains may violate applicable regulatory standards or other privacy requirements. These requirements may therefore preclude certain types of businesses from adopting blockchain despite significant benefits that could otherwise be enjoyed over currently used techniques.

These concerns may lead some entities to experiment with their own forms of encryption, which introduce different concerns. Among those concerns, encryption techniques are often driven by specific applications or users, meaning that the encryption may be non-uniform between different entities. Non-uniform solutions lead to significant concerns, as they may frustrate the long-term management of the blockchain and impair the cross-compatibility of blockchains.

Existing encryption solutions, even if uniform, can also frustrate the decentralized nature of blockchains. Most solutions are built upon a hierarchical structure that requires one or more higher level systems to manage the encryption and decryption of data. These higher level systems can be a point of vulnerability, particularly where the systems containing encryption information communicate directly with the nodes and other systems. A single hack can expose the entire system. The dependency on higher level systems also counteracts the independence that nodes ordinarily enjoy in a blockchain. If the higher level encryption system becomes inoperable, the entire blockchain may be rendered inoperable. Likewise, the nodes become dependent on the higher level system to authorize and provide encryption data, which is opposite of the collaborate process that is characteristic of nodes in a blockchain ordinarily use to build consensus about the data.

Consequently, there is a need in the art for systems and methods for encrypting data stored on blockchains so that entities may participate in a blockchain network without concerns of protecting the confidentiality of their data. Preferably, the system mimics the decentralized nature of blockchain so that participants must collaborate to reach consensus about encrypted data on the network and so that the resiliency, security, and availability of the network are improved. The system may also be uniform to promote the ease of long-term management and compatibility across numerous varieties of blockchain. The system may also be capable of accommodating certain requirements imposed by regulatory standards that govern the storage and maintenance of highly confidential and private data.

SUMMARY OF THE INVENTION

The present disclosure describes secure and distributed systems and methods for encrypting data stored on blockchain networks. The system and methods allow multiple entities to participate in a single blockchain network while ensuring that sensitive data is obfuscated to other, but not necessarily all, participants without impacting the shared nature of the blocks on the blockchain network. Embodiments of the system are decentralized, thus increasing security and resiliency. The decentralization also allows the system to enforce collaboration between entities for the purpose of encryption, which further enhances security of the system. The system and method are compatible with numerous varieties of blockchain and incorporate various security protocols that are resistant to quantum-computing. Embodiments of the invention may satisfy one or more, but not necessarily all, of the needs and capabilities described throughout this disclosure.

In a first aspect, a system for encrypting blockchain data is provided comprising a generator operable to generate an encryption key and to derive n key shares from the encryption key, wherein at least k key shares are required to assemble the encryption key and k is less than or equal to n; a controller communicatively coupled to the generator, wherein the controller is operable to receive a set of the n key shares; and a plurality of injectors, each having a persistent memory, the plurality of injectors comprising: a first injector communicatively coupled to a blockchain network and to the controller, wherein the first injector is operable to receive a first message inbound for the blockchain and to identify a data portion of the message, and wherein the first injector is operable to receive a first portion of the set of n key shares, wherein the first portion is less than k; and a second injector communicatively coupled to the blockchain network, to the controller, and to the first injector, wherein the second injector is operable to receive a second portion of the set of n key shares, wherein said second portion is less than k, wherein the first injector is operable to request that the second injector transmit the second portion and operable to encrypt the data portion using the first and second portions of the set of n key shares, wherein the encrypted data portion is injected into the blockchain, and wherein each of the plurality of injectors can read the encrypted data portion, and wherein each of the plurality of injectors stores less than k of said set of n key shares in said persistent memory.

In a second aspect, a method is provided for encrypting blockchain data comprising the steps of receiving a message inbound for a blockchain network, the message containing a data portion; transmitting a request to a controller for a first portion of a set of n key shares, wherein the set of n key shares are derived from an encryption key and at least k key shares are required to assemble the encryption key, and wherein the first portion is less than k; obtaining from at least one of a plurality of injectors a second portion of the set of n key shares, wherein the second portion is less than k; assembling the encryption key using the first portion and the second portion; extracting the data portion from the message and encrypting the data portion using the encryption key; and injecting the encrypted data portion into the blockchain, wherein each of the plurality of injectors can read the encrypted data portion, and wherein each of the plurality of injectors stores less than k of the set of n key shares in the persistent memory.

In a third aspect, a method is provided for encrypting blockchain data comprising the steps of receiving at an injector a message inbound for a blockchain network, the message containing a data portion; transmitting from the injector to a controller a request for encryption information; transmitting from the controller to a generator a request for encryption information; deriving at the generator n key shares based on an encryption key, wherein at least k key shares are required to assemble the encryption key and k is less than or equal to n; transmitting a set of the n key shares to the controller; transmitting at least a first portion of the set of n key shares to the injector; assembling at the injector an assembled encryption key using the first portion of the set of n key shares; extracting the data portion from the message and encrypting the data portion using the encryption key; and injecting the encrypted data portion into the blockchain, wherein each of the plurality of injectors can read the encrypted data portion.

In a fourth aspect, a system for encrypting blockchain data is provided comprising a generator having a seeder, wherein the seeder is configured to generate random numbers and the generator is configured to generate an encryption key using the random numbers, and wherein the generator is operable to transmit encryption information based on the encryption key; a controller communicatively coupled to the generator, wherein the controller is operable to request the encryption information from the generator and operable to transmit at least a portion of the encryption information; and a first injector communicatively coupled to the controller and to a first node on a blockchain network, wherein the first injector receives a message inbound for the node, wherein the first injector is operable to request the at least portion of the encryption information, and wherein the first injector is operable to encrypt at least a portion of the message using the at least portion of the encryption information.

In a fifth aspect, a system for encrypting blockchain data is provided comprising a first injector communicatively coupled to a first node on a blockchain network, wherein the first injector is operable to receive messages inbound for the first node; a second injector communicatively coupled to the first injector and to a second node on the blockchain network, wherein the second injector is operable to receive messages inbound for the second node; a controller communicatively coupled to the first and second injectors, wherein the controller is operable to transmit a different portion of encryption information to each of the first injector and the second injector; and a generator communicatively coupled to the controller, wherein the generator is operable to generate an encryption key and to derive encryption information based on the encryption key, and wherein the generator is operable to transmit the encryption information to said controller, wherein the first injector is operable to request the second injector transmit encryption information stored thereon and to encrypt the messages inbound for the first node using the encryption information received from the second injector and the encryption information stored on the first injector.

In a sixth aspect, a method for encrypting blockchain data is provided comprising the steps of receiving a message inbound for a node on a blockchain network; transmitting a request to a controller for a first set of encryption information; receiving the first set of encryption information from the controller; assembling an encryption key using the first set of encryption information; encrypting a portion of the message using the encryption key; and transmitting the message after encryption to the node.

In a seventh aspect, a method for encrypting blockchain data is provided comprising the steps of receiving at a first injector a message inbound for a node on a blockchain network; transmitting a request to a controller for a list of other injectors having encryption information stored thereon; transmitting a request to at least one of the other injectors to transmit encryption information to the first injector; receiving encryption information from at least one of the other injectors; assembling at the first injector an assembled encryption key using the encryption information received from the at least one other injector; encrypting at least a portion of the message using the assembled encryption key; and transmitting the message after encryption to the node.

In an eighth aspect, a method for encrypting blockchain data is provided comprising the steps of receiving at a first injector a message inbound for a node on a block chain network, wherein the first injector has encryption information stored thereon; transmitting a request to a controller for a list of other injectors having encryption information stored thereon; transmitting to one of said other injectors a message containing a first set of encryption information and a request to combine said first set of encryption information with a second set of encryption information stored on said other injector; receiving at the first injector from one of the other injectors the combined set of encryption information; assembling at the first injector an assembled encryption key using the encryption information stored thereon and the combined set of encryption information; encrypting at least a portion of the message using the assembled encryption key; and transmitting the message after encryption to the node.

The above summary presents a simplified summary to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF DRAWINGS

FIG. 6: A flowchart for one embodiment of a method of obtaining quorum to encrypt or decrypt a payload.

FIG. 7: A flowchart for another embodiment of a method of obtaining quorum to encrypt or decrypt a payload.

FIG. 8: A flowchart for one embodiment of a method of obtaining encryption information to encrypt or decrypt a payload.

DEFINITIONS

Figure 1:
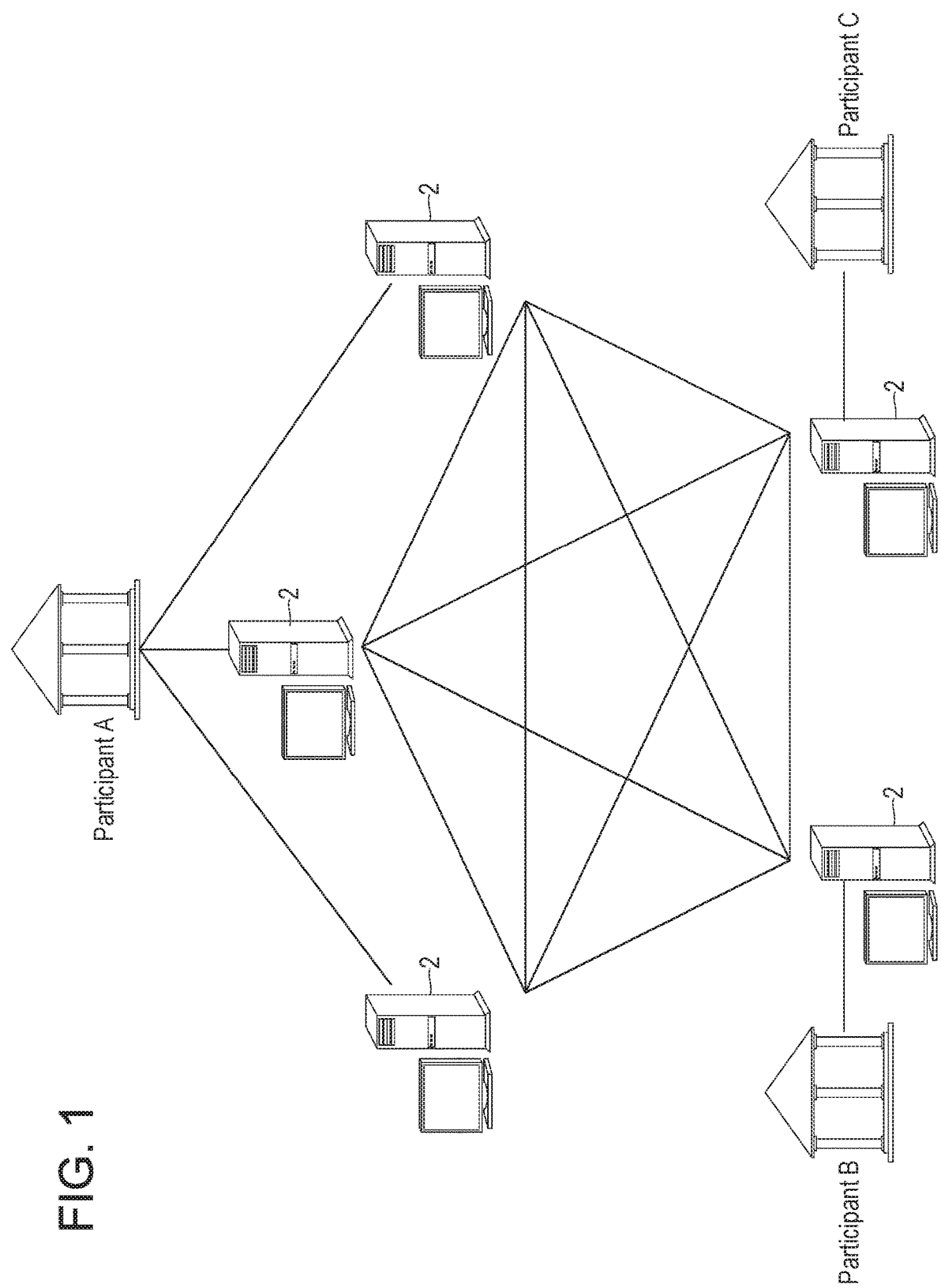
FIG. 1: A schematic diagram of an exemplary permissioned blockchain network.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an," and "the" are intended to include the plural forms as well, unless the context clearly indicates otherwise.

The terms "first," "second," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

Improved systems and methods for encrypting the payloads of blockchains have been developed. Embodiments of the improved systems and methods are described herein. The embodiments are particularly advantageous for use with permissioned blockchains where multiple entities participate in the network, although similar advantages may be enjoyed with public and private blockchains as well. The specific type of blockchain protocol is not important, and embodiments of the invention are agnostic as to the specific type of blockchain protocol used. Non-limiting examples of suitable blockchain protocols include MultiChain or other blockchain implementations that use known REST APIs for reading and writing.

Figure 2:
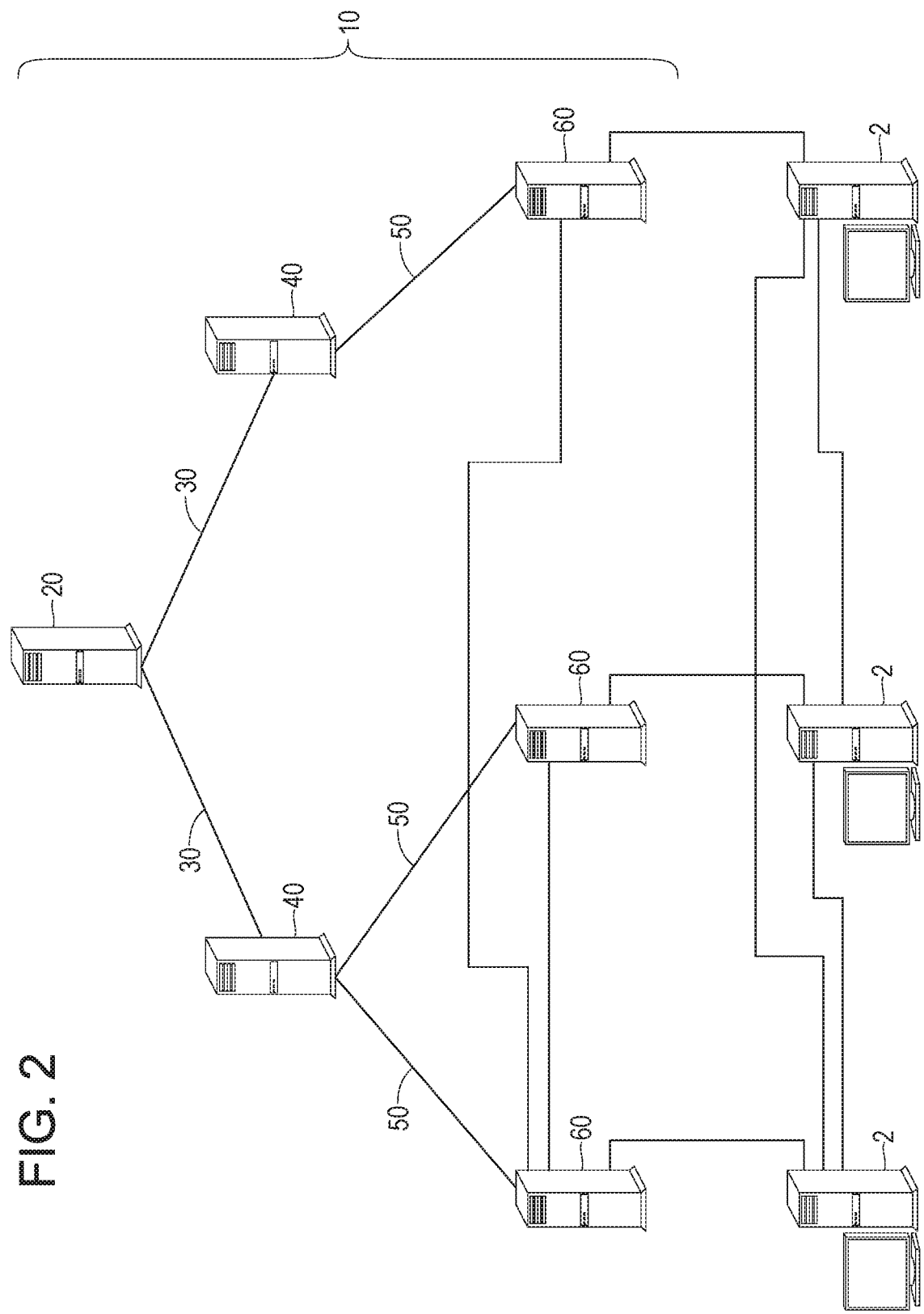
FIG. 2: A schematic diagram of an exemplary embodiment of improved system for encrypting payloads on a blockchain network.

For purposes of describing embodiments of the invention, reference is made to a permissioned blockchain network having a plurality of nodes 2 operated by a plurality of network participants. FIG. 1 illustrates the basic architecture of such a blockchain network. As used herein, the term "node" refers to an individual system (e.g. a computer or server) connected to the blockchain network that stores the entire chain of data and generates new blocks in the chain. Each network participant ordinarily operates at least one of its own nodes 2 (although shared nodes are possible). Some network participants may operate multiple nodes 2, for instance where the business has multiple business units that may have varying permissions and uses for the blockchain. Each business unit may be associated with multiple nodes 2. The following disclosure generally focuses on just one node 2 in the blockchain network, but it is to be understood that each node in the network may also have some or all of the features described herein. An embodiment of the improved system 10 for encrypting payloads is shown in FIG. 2. As shown, the system 10 comprises three components: a generator 20, a controller 40, and an injector 60. In many embodiments, each component is a separate machine and may be physically separate from the other components. In some embodiments, however, two or more components may be integrated into a single machine. Each node 2 may have its own unique instance of each component, or multiple nodes 2 may share one or more components between themselves.

In a preferred embodiment, an injector 60 is installed at each node 2, a single controller 40 is associated with all nodes 2 operated by a single business unit of a participant in the blockchain network, and a single generator 20 services all controllers 40 associated with the business units of a single participant. Optionally, multiple business units may share one controller 40, or multiple participants (e.g. businesses) may share one generator 20. This architecture may have numerous advantages. For instance, as further described below, this architecture allows the system 10 to continue to substantially function even if a controller 40 or a generator 20 becomes unavailable. In such an instance, the injectors 60 may continue to function using the encryption information already stored in memory, the only limitation being that the injectors 60 may not be able to obtain new encryption information while the controller 40 or generator 20 is down.

This architecture also allows for certain functions to be segregated, which may provide enhanced security. For instance, the generator 20 may be segregated so that it may be accessed by only controllers 40. This arrangement therefore adds a layer of security to limit access to the functions of the generator 20, which generates the secure encryption keys. Additionally, the injectors 60 may be segregated so that only they receive client communications (messages inbound and outbound from the blockchain node). Thus, the client communications never have access to the controller 40 or the generator 20.

Decoupling the injector 60 from the node 2 is also advantageous. This arrangement allows the system 10 to be agnostic regarding the particular type of blockchain. Further, the particular blockchain implementation may be changed or updated without impacting the operation of the system 10.

Each of the three components are now described in turn, followed by a more detailed description of how the components cooperate to encrypt data stored on a blockchain.

The Generator

Figure 3:
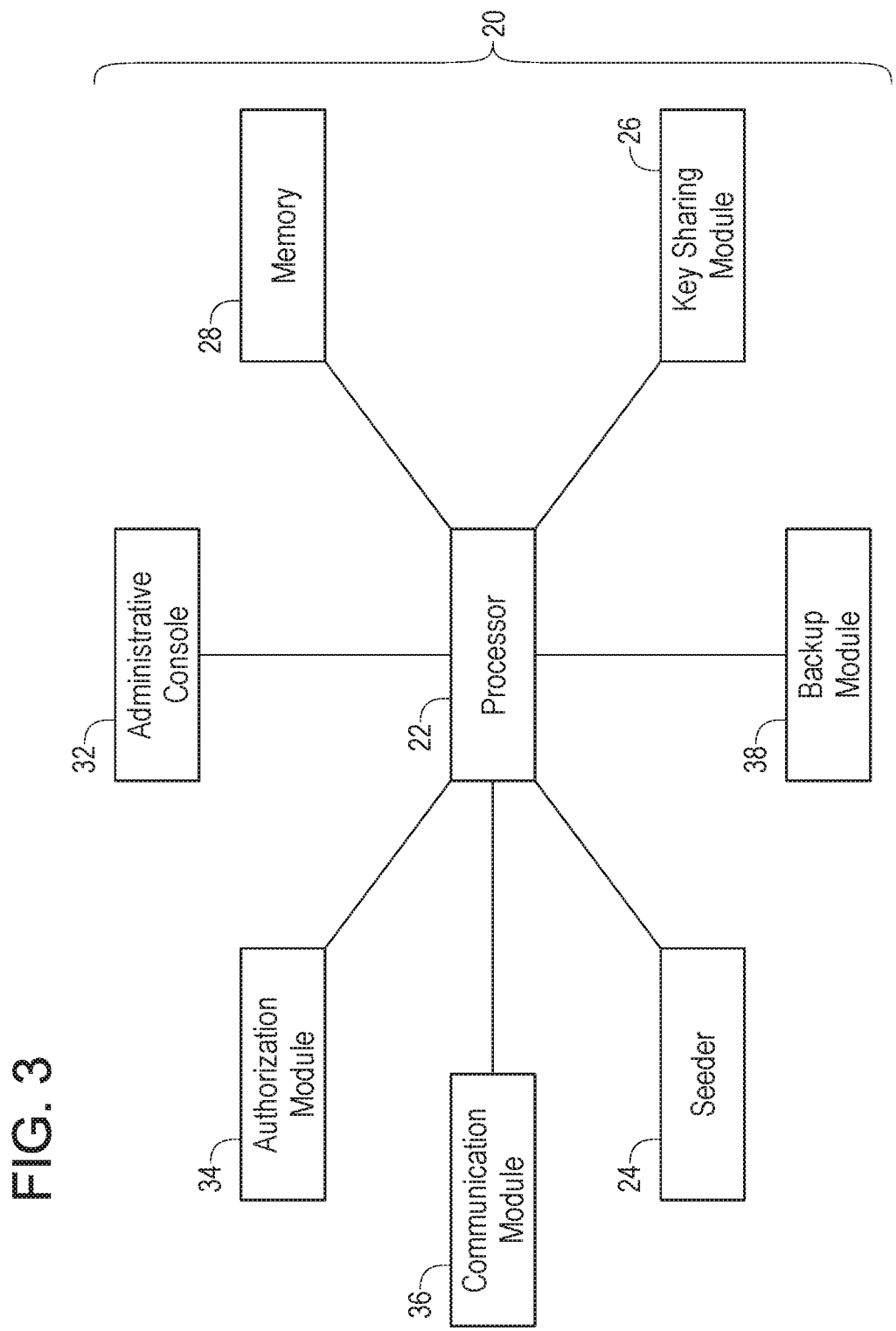
FIG. 3: A block diagram of one embodiment of a generator in the improved system for encrypting payloads.

The generator 20 generates encryption keys that the system 10 uses to encrypt the data stored on the blockchain. The generator 20 is communicatively coupled 30 to the controller 40 and includes a processor 22 and a seeder 24. The generator 20 may also include a key sharing module 26, and in some embodiments it optionally includes a memory 28 and an authorization module 34. FIG. 3 provides a block diagram of some components of the generator 20.

The generator 20 is configured to be compatible with the specific encryption protocol used by the system 10, In an exemplary embodiment, the system 10 uses the Advanced Encryption Standard ("AES") protocol. See, e.g., National Institute of Standards and Technology, Specification for the Advanced Encryption Standard ("FIPS PUB 197," 2001), available at https://nvlpubs.nist.gov/nistpubs/fips/nist.fips.197.pdf (last visited Apr. 30, 2018). The AES protocol, and encryption protocols generally, are understood by persons having ordinary skill in the art and are not described in greater detail. In a preferred embodiment of the system using the AES protocol, the generator 20 is configured to generate AES-256 encryption keys. But in other embodiments, the generator 20 may be configured to generate a different size of encryption key that is compatible with the AES protocol. Likewise, the system 10 may employ other encryption protocols, and in such embodiments the generator 20 is configured to generate encryption keys compatible with such encryption protocol. Examples of other suitable encryption techniques and protocols include lattice-based cryptography, code-based cryptography, and multivariate cryptography, which may be more resistant to quantum computing. Other cryptography techniques may also be used too, including the RSA algorithm or elliptic-curve cryptography.

The seeder 24 may be hardware or software based, or a combination of the two. In a preferred embodiment, the seeder 24 is a true random number generator. True random number generators are ordinarily hardware based and use physical phenomena to generate random numbers that are unpredictable and less susceptible to hacking. Various true random number generators are commercially available, with examples including the Quantis True Random Number Generator available from ID Quantique, various PureQuantum products available from ComScire, and the qStream Random Number Generator available from Quintessence Labs. But other embodiments may employ different devices or algorithms to generate the random numbers used for encryption keys. For instance, the seeder 24 may be a cryptographically secure, pseudo random number generator. Advantageously, a pseudo random number generator may be more readily available and less costly. Examples of cryptographically secure, pseudo random number generators include the Mersenne Twister algorithm, the Yarrow Algorithm, and the CryptGenRandom function available from Microsoft.

The generator 20 is communicatively coupled 30 through its communication module 36 to the controller 40 using any known connection type and protocol. Many embodiments use various protocols or techniques to secure communications between the generator 20 and the controller 40. These protocols may include encryption of communications and also the use of verifiable unique identifiers to authenticate each message. Such protocols may obscure communications and prevent playback attacks.

In one preferred embodiment, the communications are encrypted using the NTRU lattice-based encryption algorithm and communicated using the Transport Layer Security protocol, which is referred to as NTRU/TLS. See, e.g., Jeffery Hoffstein, Jill Pipher & Joseph H. Silverman, *NTRU: A Ring-Based Public Key Cryptosystem*, Lecture Notes in Computer Science 267-88 (1998), available at http://citeseerx.ist.psu.edu/viewdoc/summary?doi=10.1.1.25.8422 (last visited Apr. 30, 2018); Ari Singer, *NTRU cipher Suites for TLS*, Internet Engineering Task Force (Jul. 3, 2001), available at https://tools.ietf.org/html/draft-ietf-tls-ntru-00 (last visited Apr. 30, 2018). One commercially available option to implement NTRU/TLS communications is employing the wolfSSL suite, but other NTRU enabled SSL suites may be used too. Advantageously, the wolfSSL suite includes a TLS_QSH cipher, which facilitates quantum-safe handshaking without further customization.

A preferred embodiment also uses Carter-Wegman Message Authentication Codes to authenticate communications. See, e.g., Ted Krovetz, *Message Authentication on 64-bit Architectures*, 2006 Cryptology ePrint Archive 37 (2006), available at https://eprint.iacr.org/2006/037.pdf (last visited Apr. 30, 2018); Ted Krovetz, *Message Authentication on 64-bit Architectures*, Selected Areas in Cryptography (2006), available at https://pdfs.semanticscholar.org/3e1c/879f5c321c3ae32d8f6c0c8871dfd41371b8.pdf (last visited Apr. 30, 2018). This authentication technique is built upon the premise that both the sender and receiver of a communication know a certain hash function. Before transmitting a message, which may be broken into multiple subparts, a sender calculates a hash value by applying the hash function to the message or to each of its subparts. The sender then transmits the hash value along with the message or each subpart. The transmitted hash value may be encrypted, in which case both the sender and receiver must know the encryption key used to encrypt the hash value. Upon receipt of the message (or subpart), the receiver calculates a hash value using the received message and compares that hash value to the received hash value. If the hash values match, the message or subpart is valid. One available framework for implementing Carter-Wegman authentication is Poly1305-AES.

Both the NTRU/TLS protocol and the Carter-Wegman Message Authentication Codes are understood by persons of ordinary skill in the art. Of course, other protocols and techniques may be substituted. For instance, TLS may be used in conjunction with Elipctical Curve Cryptography encryption, Rivest-Shamir-Adleman encryption, or Digital Signature Algorithm encryption.

Through its communication module 36, the generator 20 is operable to receive a command from the controller 40 that instructs the generator 20 to generate an encryption key. This command may be referred to as a New Key Command. The controller 40 may be the only device authorized to request encryption information from the generator 20. In some embodiments, the New Key Command is a predefined command and takes the form of a remote procedure call. In some embodiments, the New Key Command may not include any input parameters since the encryption key is generated from random numbers. But in many embodiments the New Key Command may include various parameters that the generator 20 uses to process the command, authorize the request, and store the encryption key. Examples of parameters that may be included within the command include the entity ID requesting the key, activation time, and expiration time.

When the generator 20 receives a New Key Command, the generator 20 may take various actions before instructing the seeder 24 to generate the random numbers required for generating a new encryption key. In some embodiments, for example, the generator 20 may optionally provide certain parameters to an authorization module 34 to authenticate the request before taking further action. The authorization module 34 may in turn process the parameters to determine, for instance, whether the requesting network participant is authorized to use the system 10, whether the node is authorized on the blockchain, whether the controller 40 has properly authenticated the message, whether the command is valid, or any combination of the foregoing or other properties associated with the request. Provided that the authorization module 34 validates the request, it may provide an affirmative message that indicates that the generator 20 should continue with generating the new encryption key.

Optionally, the generator 20 may also include a memory 28 configured to store previously generated encryption keys. In some embodiments, the memory 28 is a secret vault or wallet that is unreadable or obfuscated to other processes associated with the generator 20 or other components in the system 10. Ordinarily, the encryption keys or other encryption information may be stored separate from other data to enhance security of the keys. Often separate from the encryption keys, various information may be stored in association with identifiers for each encryption key (such as a "keyID"), including the identity of the entity associated with the encryption key, the time of creation, the duration of validity for the encryption key, and the history of the key. The memory 28 may also contain a database that contains various information about the entities and sub-entities on the blockchain, including definitions, relationships, and hierarchies, as well as a map defining the association of various components on the system 10.

In embodiments with generator 20 having a memory 28, the generator 20 may thus first check its memory 28 to determine whether a valid encryption key has already been generated for the requesting entity. In the event that the generator 20 already contains a valid, unexpired encryption key, the generator 20 may respond to the New Key Command using the previously generated encryption key instead of creating a new encryption key.

Assuming that any prerequisites are satisfied and that there is no preexisting encryption key, the generator proceeds with generating a new encryption key, which may use any code library suitable for generating encryption keys. An exemplary process includes defining the structure and size of the encryption key. In the case of an AES256 key, the key is 32 bytes with an additional 16 byte or 32 byte initialization vector. The seeder 24 may then generate the random numbers that are used to populate the components of the encryption key. After the key is generated, it may also be encrypted, which can protect the key when it is stored or transmitted.

Once the new encryption key is generated (or after a previously generated encryption key is identified), the generator 20 transmits encryption information to the controller 40. In some embodiments, the encryption information is the encryption key itself. But in a preferred embodiment, the encryption information is not the encryption key itself but rather information based on the encryption key, such as portions of the encryption key or information derived from the encryption key (like the key shares discussed next).

Advantageously, the generator 20 may include a key sharing module 26 that generates the encryption information that is shared with the controller 40. In a preferred embodiment, the key sharing module 26 uses Shamir's Secret Sharing Algorithm to generate "key shares" based on the encryption key, but other key sharing algorithms may be used to generate the key shares. In general terms, a key sharing algorithm derives n pieces of information from the encryption key, which are the key shares. The key shares are configured such that, if an entity knows or possess at least k of the key shares, it may use the key shares to assemble the encryption key, which may in turn be used to encrypt or decrypt data. But if an entity has k−1 (or fewer) key shares, it cannot assemble the encryption key nor may it encrypt or decrypt any data Shamir's Secret Sharing Algorithm, or a similar approach, is thus advantageous because no entity must possess the entire encryption key, an outsider cannot simply hack one message to obtain the information required to decrypt data, and the confidentiality of data is not compromised even if one or more (but less than k) key shares become compromised. Likewise, the key shares may be distributed to the injectors 60 so that the injectors 60 must cooperate to assemble an encryption key from the key shares before encrypted data may be injected into the blockchain. Both n and k are integers that may be dynamically set, and k must be less than or equal to n. In some embodiments, n and k are parameters that are included in the New Key Command. Of course, other embodiments may use other key sharing algorithms or protocols to protect the encryption key, and those other techniques may provide some benefits similar to those discussed above. For instance, Blakeley's sharing algorithm may be used.

Shamir's Secret Sharing Algorithm is based on the idea k points are required to define a polynomial of (k−1) degree. In other words, two points are sufficient to define a line, three points are sufficient to define a parabola, four points are sufficient to define a cubic equation, and so on. Using this principal, the values for n and k must first be programmatically set. An equation is derived based on the value of k whereby the constant (S) is the secret (here S is the encryption key or a portion of the encryption key) and (k−1) numbers ($A_i$) are randomly generated as the polynomial coefficients:

$$f(X)=S+A_1X+A_2X^2+A_3X^3+\ldots+A_{k-1}X^{k-1}$$

Using that equation, n key shares may then be derived from the equation, where each key share consists of (X,f(X)). To avoid revealing the secret (S), X is not equal to 0 in any of the key shares. These key shares may then optionally be encrypted before they are transmitted or stored. The foregoing process may also be further secured by using fixed field arithmetic, which seemingly randomizes the order of the polynomial and makes the secret much harder to guess when someone possess less than k key shares.

In embodiments using Shamir's Secret Sharing Algorithm, any number of key shares may be transmitted to the controller 40. All n key shares are transmitted in some embodiments, only k key shares are transmitted in other embodiments, only k−1 key shares may be transmitted in yet other embodiments, or any other number of key shares may be transmitted depending on the configuration of the system.

The distribution of key shares often depends on whether the encryption key is one associated with just one party or one associated with multiple parties (whether entities, sub-entities, business units, etc.). In the simplest approach, an encryption key is associated with only one party. In that case, the generator 20 would ordinarily transmit at least k key shares to the controller 40. In more complicated scenarios, the encryption key may be associated with multiple parties. In those situations, the key shares are distributed amongst the parties so that the parties must cooperate to reassemble the encryption key using the key shares. This process is referred to as obtaining quorum. In this situation, the number of key shares distributed to a controller 40 will depend upon where the parties are located across the system. If all of the relevant parties are located on injectors 60 connected to the same controller 40 (such as in the case of two business units), then at least k key shares would be transmitted to the controller 40. But if the relevant parties are disbursed between injectors 60 that are connected to different controllers 40, each controller 40 would ordinarily receive no more than k−1 key shares. The precise number of key shares provided to each controller 40 would ordinarily depend on various factors, including the number of parties that must cooperate, the number of controllers 40 and injectors 60 involved, and other parameters that may be set by the user. The distribution of key shares between multiple components is also advantageous to security because, even if one component is compromised, its key shares or other encryption information is ordinarily insufficient to reconstruct the encryption key.

Where the generator 20 includes memory 28, the generator 20 may also store the new encryption key, the key shares, or other encryption information in memory 28. In a preferred embodiment, the generator 20 stores the encryption key in memory 28 but deletes (or does not store) the encryption keys or other encryption information derived from the key. Subsequently, if the generator 20 receives a request to provide key shares associated with an already-created encryption key, the generator 20 retrieves the encryption key from memory 28 and repeats the process for generating a new set of key shares. The new key shares are equally capable as the original key shares of being used by the injectors 60 to encrypt and decrypt data. The new key shares may then be redistributed to the appropriate controller(s) 40, at which point any remaining old key shares are destroyed because they cannot be used with old key shares. As a result, there may be no need for key shares to persist in the generator's memory 28.

Some embodiments of the generator 20 may also include an administrative console module 32. The administrative console module 32 may be accessible at the generator 20 itself, or in some embodiments, it may be accessible remotely, through remote procedure calls for instance. The administrative console module 32 may be configured to provide various functionality, including starting and stopping the generator 20, configuring and maintaining the generator 20, debugging the generator 20, or backing up the generator 20 or its memory 28. The administrative console module 32 may also contain audit or data analysis modules that collect information related to use of the generator 20.

In embodiments including a backup module, the generator 20 may be configured to back up its memory 28 to an external device, such as a hard disk, memory card, DVD, smart card, or other type of removable media. Such backups may be triggered by various events, such as when the generator 20 changes states. A state change may be associated with the addition of participants on the blockchain, generating new encryption keys, or generating new key shares. The information backed up may include any subset of or all of the data stored in memory 28. In a preferred embodiment, the generator 20 backs up at least the encryption keys stored in memory 28. After each backup, the generator 20 may delete some or all of its data stored in memory 28.

The Controller

Figure 4:
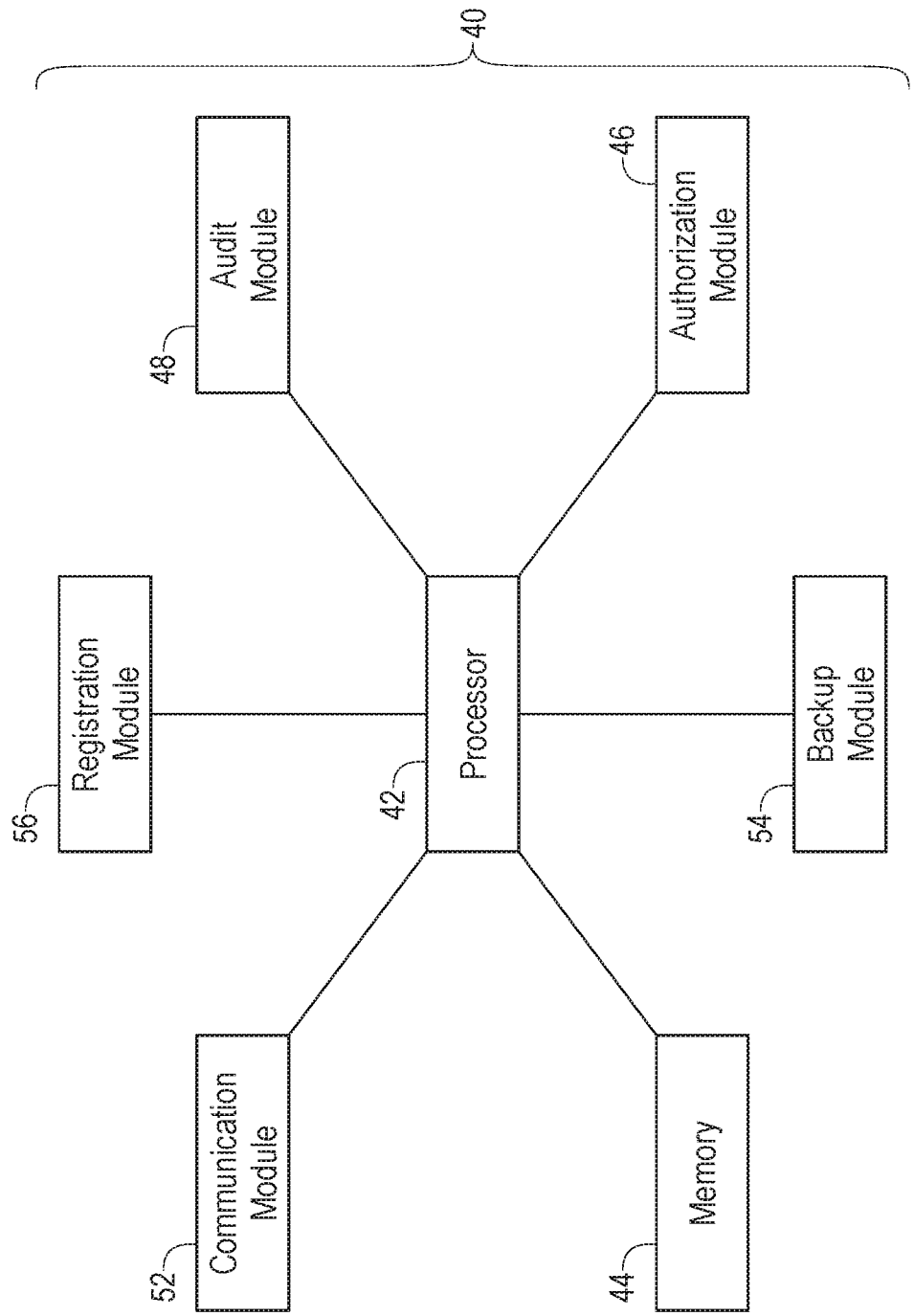
FIG. 4: A block diagram of one embodiment of a controller in the improved system for encrypting payloads.

The controller 40 manages requests for encryption information and stores encryption information that is supplied to injectors 60. The controller 40 may also control registration of injectors 60 and may maintain a map or register of the entire blockchain network or the authorized users on the network. The controller 40 is communicatively coupled 30 to the generator 20 and communicatively coupled 50 the injector 60. The controller 40 ordinarily includes a processor 42, a memory 44, and may optionally include an authorization module 46 and an audit module 48. FIG. 4 provides a block diagram of some components of the controller 40.

In some embodiments, the controller 40 includes a memory 44 for storing and maintaining encryption information and other pertinent information. As discussed above, the encryption information may be the encryption keys themselves, key shares based on the encryption keys, or other information derived from the encryption keys. Each item of encryption information may be stored with other information pertinent to the encryption information, such as the identity of the entity that is associated with the encryption information, the time of creation of the encryption information, and the duration of validity for the encryption information. Optionally, some embodiments may include a "map" or list of nodes and injectors 60 associated with that controller 40, and the map or list may include various information about the nodes or injectors 60, such as their current state (e.g. operational or not). In a preferred embodiment, the information stored in the map or list includes a list of which encryption information is currently stored on each injector 60. Some embodiments may also include other information stored in the memory 44; for instance, the memory 44 may also contain various information related to authorizating and authenticating access to the system, such as maps or lists identifying which nodes or business units are permitted certain levels of access.

In a preferred embodiment, this memory 44 may be a secret vault or wallet that is unreadable or obfuscated to other processes in the controller 40 and in other components of the system 10. Some of the information stored in memory 44 (such as the key shares) may itself be encrypted, or the entire memory 44 may be encrypted. In a preferred embodiment, the controller 40 may include a hardware security module to store sensitive information. Alternatively, the controller 40 may use other security features associated with general purpose computers. Non-limiting examples include using the mlock or shm_lock features associated with the share memory 44 control ("smhctl(2)"), using the gcry_malloc_secure( ) and gcry_free( ) associated with the cryptographic library "libgcrypt," or splitting keys or key shares over multiple locations on the RAM.

In some embodiments, some or all of the information stored in memory 44 is retained in perpetuity, unless or until the state of the controller 40 is reset. Retaining all of the information in memory 44 allows the controller 40 to enhance the speed and performance of the system by avoiding additional calls to the generator 20 to obtain information requested by injectors 60. When the controller 40 is reset, it may rebuild its cache by requesting the data form the generator 20. Alternatively, the controller 40 may not retain encryption information in memory 44, which enhances security by reducing the number of places where a malicious user may attack the system 10.

Like the communication link 30 between the generator 20 and the controller 40, the communication link 50 connects the communication module 52 of the controller 40 to the injector 60 using any known connection type and protocol. Preferably the protocols are the same for both connections. Optionally, various protocols like encryption and message authentication may be used to secure communications between the controller 40 and the injector 60. In a preferred embodiment, the communications are encrypted using the NTRU/TLS protocol and messages are authenticated using Carter-Wegman Message Authentication Codes.

Through its communication module 52 with the injector 60, the controller 40 is operable to receive a command from the injector 60 to transmit encryption information. This command may be referred to as an Encryption Information Request. Depending on the configuration of the controller 40 and the injector 60, the injector 60 may be requesting that the controller 40 transmit only a subset of the encryption information that is maintained by the controller 40. For instance, if the controller 40 maintains k key shares, the injector 60 may request only k−1 keys shares. Or the injector 60 may request k key shares even though the controller 40 maintains n key shares. The Encryption Information Request may be a predefined command and may take the form of a remote procedure call. Included within the Encryption Information Request may be various parameters that the controller 40 uses to process the command, authorize the request, or provide encryption information. Examples of parameters that may be included within the command include the injector's ID or information that identifies or authenticates the requestor.

When the controller 40 receives an Encryption Information Request, the controller 40 may take various actions before obtaining the encryption information necessary to respond to the injector's request. For instance, in embodiments with an authorization module 46, the controller 40 may supply parameters from the Encryption Information Request to the authorization module 46, which may verify that the command is authorized. The authorization module 46 may check, for example, whether the network participant attempting to input data is authorized to use the system 10, whether the node is authorized on the blockchain, whether the injector 60 has provided the proper parameters for requesting encryption information, or any combination of the foregoing or other properties associated with the request. Provided that the authorization module 46 validates the request, it may provide an affirmative message that indicates that the controller 40 should continue with providing the requested encryption information.

The controller 40 may also optionally provide information about the Encryption Information Request to the audit module 48. Depending on the embodiment, the audit module 48 may track various information about not just Encryption Information Requests but other events as well. In a preferred embodiment, the audit module 48 is configured to provide an independent, time-stamped, auditable trail of events that occur on the controller 40. Non-limiting examples of information that may be tracked by the audit module 48 include connections between the controller 40 and either injectors 60 or the generator 20, the types of requests received, the identity of the requestor, the numbers of requests, the entities or injectors associated with the requests, the number of invalid requests or exceptions, the reasons for invalid requests or exceptions, any failures of the controller 40, and like information. This audit information may be periodically transmitted to an administrator or otherwise accessible to ensure that the system 10 is properly operating and not subject to abuse.

Provided that all prerequisites are satisfied, the controller 40 obtains the encryption information necessary to respond to the command from the injector 60. Ordinarily, the controller 40 first checks its memory 44 to determine whether the controller 40 already possess the necessary encryption information. Such a situation may occur when, for instance, a different injector had previously requested the encryption information. In that instance, the encryption information is likely already stored in the controller's memory 44 but has not yet been transmitted to the requesting injector 60. If the controller 40 does possess encryption information in its memory 44, the controller 40 may also check to ensure that the information remains valid. In some embodiments, encryption information may be valid for a limited period of time, after which the controller 40 must request new encryption information from the generator 20. If the encryption information is still valid, then the controller 40 may proceed with responding to the injector 60 without querying the generator 20.

In the event that the controller 40 does not possess currently valid encryption information, the controller 40 transmits a New Key Command to the generator 20. As discussed above, the generator 20 will, assuming receipt of a valid New Key Command, return the requested encryption information. Upon receiving the encryption information, the controller 40 may then store the encryption information in its memory 44.

Once the controller 40 possess the necessary encryption information, the controller 40 responds to the Encryption Information Request from the injector 60. In some embodiments, the controller 40 may respond by transmitting to the injector 60 all of the encryption information that the controller 40 possesses. But in other embodiments, the controller 40 transmits only a subset of the encryption information that it possesses.

In a preferred embodiment where the generator 20 uses Shamir's Secret Sharing Algorithm or another key sharing algorithm or protocol, the controller 40 transmits key shares based on the number of parties associated with the particular encryption key. In situations where the encryption key is associated with only one party, the controller 40 ordinarily transmits at least k key shares to the requesting injector 60. But in situations where the encryption key is associated with multiple parties, the controller 40 ordinarily distributes the key shares between multiple injectors 60. As a result, no injector will possess more than k−1 key shares. The precise number of key shares distributed to each injector 60 may be programmatically set, and may depend on other factors, such as the number of parties and number of injectors 60 involved in obtaining quorum. The controller 40 may also contain a map or list of which injectors 60 contain key shares so that the controller 40 may distribute that information to the injectors 60 attempting to obtain quorum. In some embodiments, the controller 40 deletes the key shares or other encryption information after transmitting it to the respective injectors 60.

Optionally, the controller 40 may also include a management module, which may be accessible at the controller 40 or remotely. The management module allows administrators or other authorized individuals to monitor and configure the controller 40. It may also provide various other functionality, including starting and stopping the controller 40, debugging the controller 40, or backing up the controller 40 or its memory 44. The management module may also contain the authorization module 46 or the audit module 48.

Advantageously, the controller 40 may optionally include a backup module 54 that allows its memory 44 to be backed up to protect from failures of the controller. In such embodiments, the controller 40 may be configured to back up its memory 44 to an external device, such as a hard disk, memory card, DVD, smart card, or other type of removable media. In the event that the controller 40 fails or otherwise loses the data stored in memory 44, the backup allows the information to be restored to the controller 40 without the processes that would otherwise be required to restore functioning of the system 10.

The controller 40 may also contain a registration module 56, which controls the registration of new injectors 60. The registration module 56 may maintain a list of authorized injectors 60, as well as nodes and entities that are authorized on the blockchain. As described below, when the controller 40 receives a request to initialize a new injector 60, the registration module 56 may handle that request.

The Injector

Figure 5:
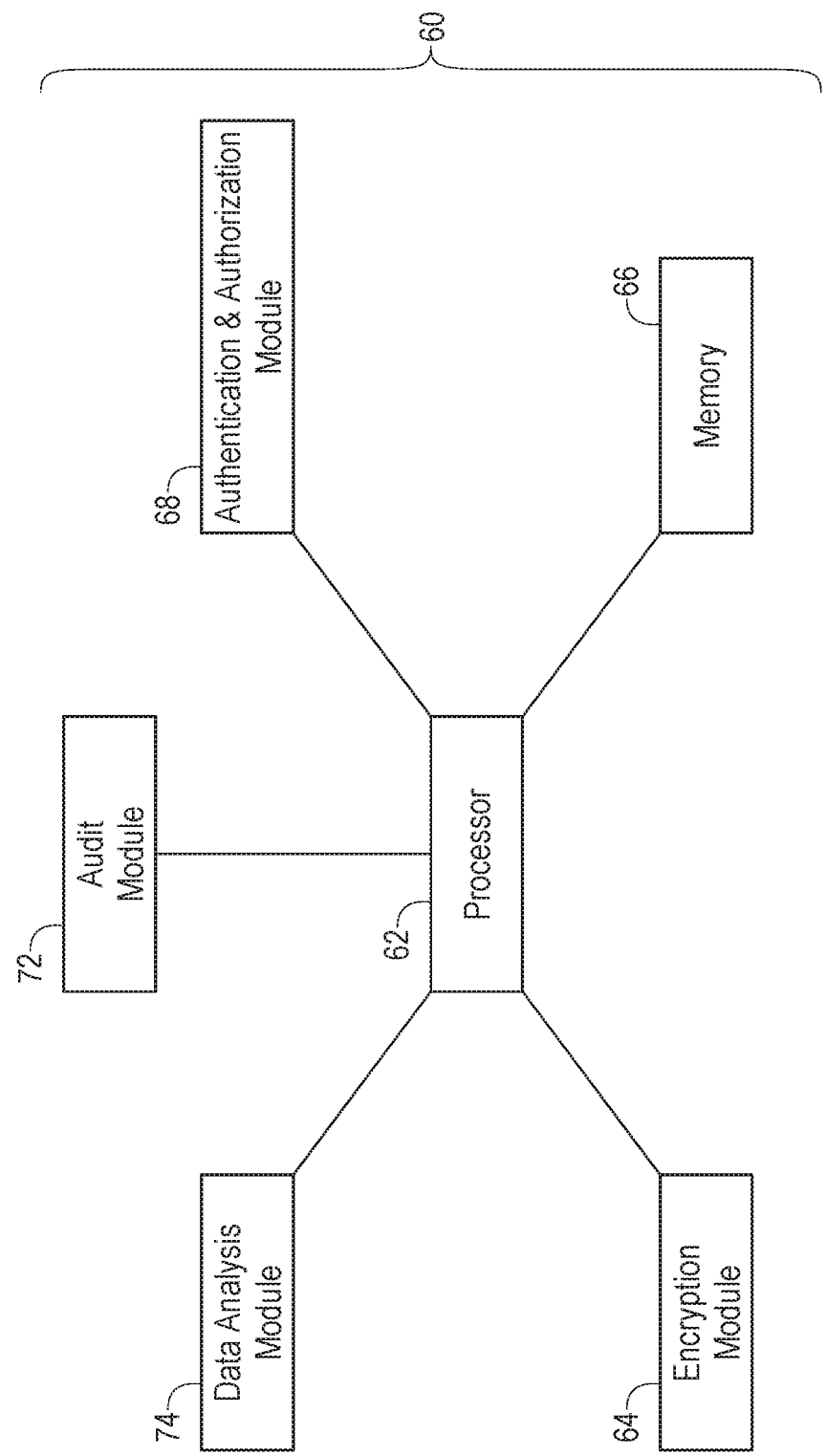
FIG. 5: A block diagram of one embodiment of an injector in the improved system for encrypting payloads.

The injector 60 overlays a node 2 in the blockchain network so that the injector 60 can intercept messages and encrypt their data before that data is inserted by the node 2 into new blocks on the chain. The injector 60 is communicatively coupled to both a node 2 in the blockchain and the controller 40. The injector 60 includes a processor 62, an encryption module 64, and it optionally includes a memory 66, an authentication and authorization module 68, an audit module 72, and a data analysis module 74. FIG. 5 provides a block diagram of some components of the injector 60.

In many embodiments, the injector 60 includes a memory 66 for storing and maintaining encryption information. Similar to the memory 66 associated with the controller 40, each item of encryption information may be stored in memory 66 with other information pertinent to the encryption information, such as the identity of the entity that is associated with the encryption information, the identity of users authorized to use the encryption information, the time of creation of the encryption information, and the duration of validity for the encryption information. Some of the information stored in memory 66 (particularly the key shares) may itself be encrypted, or the entire memory 66 may be encrypted. In embodiments where the key shares (or other encryption information) are maintained in an encrypted format, the injector 60 may be the only component that decrypts the key shares. Thus, the key shares may be stored in memory 66 in an encrypted format, but when the injector 60 prepares to encrypt or decrypt a blockchain payload, the injector 60 decrypts the key share in a secure memory location.

In a preferred embodiment, the memory 66 may be a secret vault or wallet that is unreadable or obfuscated to other processes in the injector 60 and in other components of the system 10. In a specific preferred embodiment, the injector 60 includes a hardware security module to store sensitive information. Alternatively, the injector 60 may use other security features associated with general purpose computers. Non-limiting examples include using the mlock or shm_lock features associated with the share memory control ("smhctl(2)"), using the gcry_malloc_secure( ) and gcry_free( ) associated with the cryptographic library "libgcrypt," or splitting keys or key shares over multiple locations on the RAM.

The injector 60 may also contain certain rules or other instructions that control how long encryption information persists in memory 66. Where those conditions are no longer satisfied as to certain encryption information, that information may be permanently deleted from memory 66. In an exemplary embodiment, the injector 60 is configured so that a piece of encryption information is automatically deleted if it is not use for a specified period of time. This feature enhances the security of the system 10 by ensuring that an injector 60 contains only a limited subset of the encryption information needed to access data on the block chain. Of course, other rules and procedures may be likewise employed to control the amount and duration of encryption information stored on any one injector 60.

The injector 60 is communicatively coupled to the node so that it receives all of or a subset of the communications directed to the node. In some embodiments, this is accomplished by interposing the injector 60 on the node's communication line such that all messages inbound for the node must first pass through the injector 60. But in other embodiments, the node may have a separate communication line with the injector 60. In that case, the node may selectively pass messages to the injector 60 when those messages require encryption or further processing by the injector 60. In either event, the communication link between the node and the injector 60 may be unsecured, or it may secured using any of the various protocols that are used to secure communications between other components in the system 10. The node 2 and the injector 60 may also be integrated into one unit.

Through its communication link to the node, the injector 60 monitors for messages that instruct the node to add data to a new block in the chain. The injector 60 may also monitor for other types of messages that it may act upon before passing the messages to the node (such as by tracking data for audit logging or for data analysis), or the injector 60 may automatically pass messages to the node without further processing. The injector 60 may also intercept outbound messages from the node and further process those messages, such as by decrypting their data, before passing the messages to the outbound recipient. Decryption generally follows the reverse process that is described herein.

The structure of messages received by the injector 60 may vary depending on the type of blockchain protocol being used by the network. But in general, when the system 10 is configured, part of the configuration includes defining the blockchain(s) on which the system operates. With that information, the injector 60 can then monitor communications inbound to and outbound from the node 2. When the injector 60 detects a message that requires encryption or decryption, the injector 60 extracts the data portion of the message, completes the encryption of decryption, injects the encrypted/decrypted data back into the message, and passes it to the node 2 or the requestor. The precise message structure and will vary depending on the particular flavor of blockchain. Various steps may occur during the injector's processing of the message.

For instance, in some embodiments, the injector 60 includes an authentication and authorization module 68. When the injector 60 receives a new message, the injector 60 may transmit certain information to the authentication and authorization module 68. The authentication and authorization module 68 then processes that information to verify the identity of the sender and confirm that the sender has appropriate permissions to enter the data into the blockchain. Provided that the message is authenticated and authorized, the module may provide a confirmation to the injector 60.

Some embodiments may also include an audit module 72 or a data analysis module 74. In some embodiments, the audit module 72 is configured to provide an independent, time-stamped, auditable trail of events that occur on the injector 60. Depending on the embodiment, the audit module 72 may track various information about the types of messages, the identity of the sender, the number of messages, the entities associated with the message, the number of invalid messages, the reasons for invalid messages, and like information. The data analysis module 74 may also track certain statistics that are used to analyze metrics associated with the system, such as its efficiency, speed, throughput, latency, security, or reliability. This information may be later used to analyze and improve the performance of the system. Either or both of the audit information and data analysis information may be periodically transmitted to an administrator or otherwise accessible to ensure that the system 10 is properly operating and not subject to abuse.

Assuming that all prerequisites are satisfied, the injector 60 proceeds with encrypting the data. Ordinarily, the encryption process starts with injector 60 obtaining the appropriate encryption information. In some embodiments, the injector 60 may itself obtain the encryption information and then transmit it to the encryption module 64 when sending an instruction for the module to encrypt the data. But in other embodiments, the injector 60 may instruct the encryption module 64 to encrypt the data, at which point the encryption module 64 may then proceed with obtaining the encryption information. Regardless of the precise order, the injector's instructions to the encryption module 64 also include at least the data to be encrypted, but the injector 60 may optionally transmit the entire message or other information to the encryption module 64.

The encryption information is retrieved from the optional memory 66 or requested from the controller 40. Specifically, in embodiments where the injector 60 includes a memory 66 that stores sets of encryption information, the injector 60 (or the encryption module 64) may first check the memory 66 for valid encryption information. If the memory 66 does not contain encryption information (or if it contains expired encryption information), the injector 60 transmits an Encryption Information Request to the controller 40. As discussed above, the controller 40 will, assuming receipt of a valid Encryption Information Request, return the requested encryption information to the injector 60.

Using the pertinent encryption information (whether retrieved from memory 66 or a request to the controller 40), the encryption module 64 proceeds with encrypting the data in the message. As discussed above, the encryption module 64 may use any known technique for encryption, and in a preferred embodiment, it uses the Advanced Encryption Standard. The OpenSSL library is one example of a suitable library for encrypting the message, but any other suitable code library may be used. Before calling the encryption function, an array may be generated based on the size of the message and based on any padding required to accommodate the soon-to-be encrypted message. Thereafter, an encryption function may be called and supplied with the message, the encryption key, and the padded array. The function will then return an array containing the encrypted message.

In some embodiments using key shares (such as those based on Shamir's Secret Sharing Algorithm or another key sharing algorithm or protocol), the encryption process may require the injector 60 to cooperate with other injectors in the system 10 to obtain at least k key shares to enable encryption of the data. The injectors 60 are communicatively coupled to one another to accomplish this process, which may be referred to as obtaining quorum. The requirement of quorum is often imposed when multiple parties share an encryption key that is used to encrypt data that is shared between the parties. In general terms, the quorum process requires the injector 60 to contact other injectors and request that they provide their key shares so that at least k key shares are available to reassemble the encryption key. The different processes for obtaining quorum are more fully described below. The encryption key can then be assembled from the at least k key shares and be used to encrypt or decrypt data. Ordinarily, the encryption key is thereafter deleted. In many embodiments, the key shares obtained from other injectors are also deleted, although in some situations, the injector 60 may be permitted to retain the key shares in secure memory for a limited duration of time or based on certain conditions. Certain injectors 60 may also be classified as "trusted" injectors, in which case they may have greater rights to retain key shares. Retaining key shares in memory 66 may be advantageous to enhance processing speed and availability of the system 10.

In a specific embodiment using Shamir's Secret Sharing Algorithm, the key shares may be interpolated to find the coefficients of the polynomial. For instance, Lagrange basis polynomials may be calculated from the key shares, which can then be used to derive a polynomial curve of (k−1) degree that fits the points. Once derived, the free coefficient (the constant) contains the secret (S), which in this case is the encryption key or a portion of the encryption key.

Once the data is encrypted, the encryption module 64 returns the encrypted data to the injector 60, which then transmits a message containing the encrypted data to the node. The node, upon receiving the message with encrypted data, proceeds in accordance with the blockchain's protocol for adding new data to the next block in the chain. Once added to the blockchain, the encrypted data may be viewed by any participant in the blockchain network, but the data is obfuscated to all participants except those who are authorized to use the encryption information that is capable of decrypting the data.

The foregoing architecture has numerous advantages because it parallels the distributed and decentralized nature of blockchain networks. First, once key shares have been generated and disbursed amongst the various nodes, the controller 40 and generator 20 may be no longer required unless a new encryption key or a new set of key shares is required. Thus, the nodes 2 and injectors 60 are largely self-sufficient and able to operate independent of the higher level components in the system 10. Even if the controller 40 or the generator 20 are down, or for that matter even if some of the nodes 2 or injectors 60 are down, the system 10 can continue to function so long enough nodes remain operational to obtain quorum.

Additionally, the system 10 promotes collaboration and coordination amongst the nodes 2 and injectors 60 to validate requests for encryption information. Because encryption information is often disbursed between those components, a malicious actor ordinarily must fool multiple injectors 60. Thus, the system 10 has greater security than systems that may be vulnerable to an attack on one centralized system that contains all of the encryption information.

Operation of the System Having described the various components of the system 10, the operation of the system 10 is now described in greater detail.

1. Installation and Initialization of the System and New Nodes

An embodiment of the system 10 and its components may be installed and initialized as follows. It should be noted that the entire system 10 may be installed and initialized at one time, or after the system 10 is operational, additional components (e.g. a node and injector 60) may be subsequently installed and initialized on the system 10. The installation and initialization of the system 10 may occur before or after the associated blockchain network is established.

Ordinarily, a generator 20 is the first component to be installed. Once the generator 20 is powered on, a user may use a console or other interface to initialize and configure the generator 20. The initialization and configuration process may include various steps. One part of the process may include defining a top level entity, such as the network participant(s), business, or group of businesses, who own or operate the generator 20. The process may also include defining various sub-entities and their associated rights to manage and access the system 10. The process may also include setting up portions of the authentication and authorization module 68 that control access to the system 10 and its various components.

One or more controllers 40 are ordinarily installed and initialized after the generator 20 is operational. After power up, the controller 40 may be configured so that it is associated with the top level entity or one or more of the sub-entities. The configuration may also include establishing a communication link between the controller 40 and the generator 20, such as by supplying an IP address for the generator 20. Using that communication link, the controller 40 may communicate with the generator 20 to authorize or authenticate the controller 40. Once configured, the controller 40 may request that the generator 20 transmit a subset of its data that is associated with the assigned entity. For instance, the generator 20 may transmit a pertinent subset of a map or list that identifies the various nodes and their relationships within the assigned entity. The data may also include information about permissions or authorizations for nodes on the system 10. After set up, the controller 40 is operational. It may issue commands to and receive messages from the generator 20, receive and respond to commands from injectors 60, and cooperate to set up and configure other controllers 40 or new injectors 60. In some embodiments, a parent controller 40 is first set up, and one or more child controllers 40 may then be set up under the parent controller 40.

Injectors 60 are ordinarily initialized after the generator 20 is initialized and at least one controller 40 is initialized. After the injector 60 is powered up, the injector 60 is configured, which may include providing the IP address for the appropriate controller 40. The injector 60 may then establish a communication link with the controller 40, which may allow the injector 60 to authenticate itself and register with the controller 40. Once registered, the injector 60 may receive further data from the controller 40. Examples of data that the injector 60 may receive include a list of other injectors 60 under the same controller 40, maps of users or entities, and authorization or authentication information.

In some embodiments, the injector 60 and node 2 may be combined into one package. In that instance, registration of the injector 60 may also be associated with configuring the node 2 to operate on the blockchain network. In some embodiments, the controller 40 may provide information like the names of the applicable blockchains, the associated port numbers, and other blockchain parameters. The injector 60 may pass this information to the node 2, or the injector 60 may create scripts to execute on the node 2 to cause it to join the appropriate blockchain network. The injector 60 may then monitor the node 2 as it syncs with other peer nodes 2. Once the injector 60 determines that the local node's headers and blocks are synced with its peers, the injector 60 may open its port to receive client communications (e.g. read and write requests to the blockchain).

2. Process for Obtaining Encryption Information without the Requirement of Quorum Once the system 10 is operational, the injector 60 may cooperate with other components of the system to encrypt and decrypt data on the blockchain. The process shown in FIG. 8 is exemplary of how the injector 60 may, in situations where a quorum of injectors is not required, cooperate with controller 40 and generator 20 to encrypt and decrypt blockchain payloads. Exemplary processes involving quorum are described next in reference to FIGS. 6 and 7. For each of the processes described in FIGS. 6-8, it is to be understood that not all steps are required, that additional steps may be performed during the process, and that the steps may be performed in an order different from described herein.

The process shown in FIG. 8 begins at step 801, where the injector 60 receives or intercepts an inbound message that contains a payload that is to be encrypted or an outbound message that contains a payload that is to be decrypted. At step 802, the injector 60 may then verify that the request is authentic and that the requestor is authorized to encrypt or decrypt the data at that node 2.

At step 803, the injector 60 determines whether it currently possesses the encryption information that is required to encrypt or decrypt the data. As discussed above, an injector 60 may temporarily store encryption information, or in some embodiments, it may persistently store certain types of encryption information. If the injector 60 possesses the necessary encryption information, the process may skip to step 812. Otherwise, the injector 60 must request the encryption information from the controller 40 and the process proceeds to step 804, where the injector 60 transmits a request to the controller 40 for the encryption information. The request may be the Encryption Information Request discussed above.

Next, at step 805, the controller 40 determines whether it possesses the encryption information requested by the injector 60. In some embodiments, the controller 40 may not store encryption information in its memory, in which case step 805 may be skipped. But if the controller 40 does possess the requested encryption information, the process may then skip to step 811. If the controller 40 does not possess the information, the controller 40 proceeds to step 806, where it transmits a request to the generator 20 for the encryption information. The request may be the New Key Command discussed above.

The generator 20 receives the request and, at step 807, determines whether the generator 20 already possess an encryption key that is applicable to the requesting entity. If the generator 20 does not possess such an encryption key, the generator proceeds to step 808 to generate a new encryption key for the requesting entity. This step may proceed as described above and may include various authentication or authorization checks before generating the encryption key. Once the generator 20 possesses the appropriate encryption key, whether retrieved from its memory or newly generated, it derives encryption information from the encryption key at step 809. Note however that, in some embodiments, the generator 20 may store encryption information in memory, in which case the generator 20 may not generate new encryption information. The generator 20 then proceeds to step 810 and transmits the requested information to the controller 40.

At step 811, the controller 40 possess the requested encryption information (whether from memory or through a request to the generator) and transmits the information to the requesting injector 60. Optionally, the controller 40 may also store the encryption information in its memory, but in many embodiments, the encryption information does not persist on the controller 40.

After obtaining the encryption information from memory or the controller 40, the injector 60 uses the encryption information at step 812 to assemble the encryption key. Then, at step 813, the injector 60 uses the assembled encryption key to encrypt or decrypt data, as the case may be. The assembly of the encryption key and the encryption or decryption may proceed using any of the methods and protocols discussed above. Once the data is encrypted or decrypted, the injector 60 transmits either the encrypted payload to the node 2 or the decrypted payload to the requesting entity. The injector 60 also, at step 815, destroys the assembled encryption key so that it does not persist in memory. Depending on the embodiment, the injector 60 may, however, store the encryption information in memory. As discussed above, the encryption information may persist for a limited duration of time or only so long as certain conditions are satisfied.

3. Obtaining Quorum to Encrypt Data

As discussed above, in some situations, a quorum of injectors 60 is required to assemble an encryption key. FIGS. 6 and 7 illustrate two exemplary processes by which a requesting injector 60 may cooperate with other injectors 60 and, optionally, the controller 40 to obtain quorum for encrypting and decrypting data.

In the first exemplary process, at step 601 the injector 60 receives an inbound message requiring encryption or an outbound message requiring decryption. At step 602, the injector 60 determines which encryption information is required to encrypt or decrypt the data. Optionally, this step 602 may include authenticating the requestor and confirming the requestor's authorization to encrypt or decrypt the data. As part of step 602, the injector 60 may also determine whether the particular request is one that requires obtaining quorum from other injectors 60.

Assuming that the request is one where quorum is required, the injector 60 proceeds to step 603 and requests that the controller 40 transmit a list of injectors 60 having the encryption information capable of satisfying the necessary quorum. The list received from the controller 40 may also include a list in IP addresses or similar information to contact the injectors 60. It should be noted that this list could be supplied well in advance from the controller 40 and stored in the memory of the injector 60. After obtaining the list, the requesting injector 60 then transmits, at step 604, to the other injectors a request that those injectors transmit the specified encryption information to the requesting injector 60. The requesting injector 60 may also transmit certain authentication or authorization information that the other injectors use to verify the request.

At step 605, the requesting injector 60 receives the responses from the other injectors and determines whether quorum is satisfied by the responses received. Quorum may be defined consistent with any of the disclosure above. Quorum may not be satisfied for various reasons. In some instances, quorum may not be satisfied because a certain number of injectors fails to respond to the requesting injector 60. But even if all injectors respond, some of the other injectors may not possess current encryption information (perhaps because it has expired), in which case their responses cannot be used to satisfy quorum. Regardless of the reason, if quorum is not satisfied, the process proceeds to step 606, where the encryption or decryption request may fail. In such an instance, the read/write request may not be permitted. Alternatively, the injector may re-attempt the read-write process, this time by requesting that the controller 40, obtain and distribute a new set of encryption information to each of the respective injectors 60. In that case, the requesting injector 60 may reattempt obtaining quorum by repeating steps 604-605. It is also worth noting that a different injector 60 may be responsible for collecting the key shares and checking quorum. By segregating this aspect from the requesting injector, it ensures that the requesting injector does not obtain the all of the key shares.

If, however, quorum is obtained, the injector proceeds to step 607. Using the encryption information obtained from the other injectors and the encryption information stored on the requesting injector 60, the injector 60 assembles the encryption key using any of the protocols described above. Once the encryption key is assembled, the injector 60 uses the encryption key at step 608 to encrypt or decrypt the data, as the case may be. The injector 60 then transmits the encrypted or decrypted data at step 609, and at step 610, it deletes the assembled encryption key and the encryption information received from the other injectors.

Quorum may also be obtained using an alternative process, such as that illustrated in FIG. 7. At step 701, the injector 60 receives an inbound message requiring encryption or an outbound message requiring decryption. At step 702, the injector 60 determines which injectors are available and contain encryption information that is needed to satisfy quorum. This step 702 may include sending a request to the controller 40 to obtain a list of injectors, or in some embodiments, the injector 60 may already contain a map or list of injectors containing certain encryption information.

At step 703, the injector 60 transmits a request to the one of the other available injectors. The request includes an instruction that requests the receiving injector to begin assembling an encryption key to satisfy quorum for the requesting injector 60. The request may also include certain authentication or authorization information that is necessary to verify the request, and it may further include a list of other available injectors. Assuming that the request is valid, the receiving injector 60 proceeds to step 704 and combines its stored encryption information with any encryption information received from the requestor. The encryption information may be combined by simply building a dataset or list containing each piece of encryption information, or more complex methods may be used to combine the encryption information.

Next, at step 705, the receiving injector 60 determines whether encryption information from additional injectors is required to satisfy quorum. That is, assuming that k key shares are required to re-assemble an encryption key and that the requesting injector possess only 1 key share, the receiving injector 60 checks to see whether k−1 key shares have been combined in the current set of combined encryption information. If they have, quorum will be fulfilled when the combined encryption information is transmitted back to the requesting injector, which can then add its own encryption information to satisfy quorum. But if the combined encryption information consists of less than k−1 key shares, additional encryption information is necessary to satisfy quorum. Thus, at step 706, the combined encryption information is transmitted to the next available injector. The next available injector then repeats steps 704 and 705, which may be repeated again.

Once the combined encryption information consists of k−1 key shares (or more generally, k minus the number of key shares stored on the requesting injector), the combined encryption information is transmitted back to the requesting injector 60 at step 707. Thereafter, at step 708, the requesting injector 60 assembles the encryption key by combining the combined encryption information with the encryption information stored on the requesting injector 60. At that point, quorum has been satisfied and encryption or decryption may proceed.

Once the encryption key is assembled, the injector 60 uses the encryption key at step 709 to encrypt or decrypt the data, as the case may be. The injector 60 then transmits the encrypted or decrypted data at step 710, and at step 711, it deletes the assembled encryption key and the encryption information received from the other injectors.

We claim:

1. A system for encrypting blockchain data comprising:
   one or more processors; and
   one or more memories for storing computer executable instructions that, when executed by the one or more processors, cause the one or more processors to implement:
      a generator configured to generate an encryption key and to derive n key shares from said encryption key, wherein at least k key shares are required to assemble said encryption key and k is less than or equal to n;
      a controller communicatively coupled to said generator, wherein said controller is configured to receive a set of said n key shares; and
      a plurality of injectors, each having a persistent memory, the plurality of injectors comprising:
         a first injector communicatively coupled to a blockchain network and to said controller, wherein said first injector is configured to receive a first message inbound for said blockchain and to identify a data portion of said message, and wherein said first injector is configured to receive a portion of said set of n key shares from said controller and to store said portion of said set of n key shares in said persistent memory of said first injector, wherein said portion is less than k; and a second injector communicatively coupled to said blockchain network, to said controller, and to said first injector, wherein said second injector is configured to receive a different portion of said set of n key shares from said controller and to store said different portion of said set of n key shares in said persistent memory of said second injector, wherein said different portion is less than k, and wherein the key shares from said controller stored in said persistent memory of said second injector include at least one key share that said first injector did not receive from said controller, wherein said first injector is configured to encrypt said data portion without communicating with said controller by requesting that said second injector transmit said different portion and encrypting said data portion using said portion of said set of n key shares stored in said persistent memory of said first injector and said different portion received from said second injector, wherein said encrypted data portion is injected into said blockchain, wherein each of said plurality of injectors can read said encrypted data portion, and wherein each of said plurality of injectors stores less than k of said n key shares in said persistent memory, and wherein said first injector is configured to encrypt a subsequent data portion of a subsequent message using only said key shares stored in said persistent memory of said plurality of injectors, wherein said first injector is configured to encrypt even if at least one of said controller and said generator is temporarily unavailable.

2. The system of claim 1, wherein said generator comprises a true random number generator.

3. The system of claim 1, wherein said controller is physically separate from said generator.

4. The system of claim 1, wherein said first injector is physically separate from said controller.

5. The system of claim 1, wherein said encryption key is an Advanced Encryption Standard-256 encryption key.

6. The system of claim 1, wherein said first injector is configured to encrypt using the Advanced Encryption Standard protocol.

7. The system of claim 1, wherein said portion combined with said different portion is greater than or equal to k.

8. The system of claim 1, said plurality of injectors further comprising:

a third injector communicatively coupled to said blockchain network, to said controller, and to said first injector, wherein said third injector is configured to receive a third portion of said set of n key shares, wherein said third portion is less than (k−1), wherein said portion is less than (k−1) and said different portion is less than (k−1), and wherein said first injector is configured to request that said third injector transmit said third portion and to use said third portion when encrypting said data portion.

9. The system of claim 1, wherein said first injector has a dataset containing a list of said plurality of injectors having at least one of said n key shares stored in persistent memory.

10. The system of claim 1, wherein said second injector is configured to decrypt said encrypted data portion using only said key shares stored in said persistent memory of said plurality of injectors, wherein said second injector is configured to decrypt even if at least one of said controller and said generator is temporarily unavailable.

11. A method for encrypting blockchain data comprising the steps of:

receiving at a first injector a message inbound for a blockchain network, said message containing a data portion;

transmitting a request to a controller for a portion of a set of n key shares, wherein said set of n key shares are derived from an encryption key and at least k key shares are required to assemble said encryption key, and wherein said portion is less than k;

receiving at said first injector said portion of said set of n key shares from said controller and storing said portion in a persistent memory of said first injector;

obtaining from at least one other injector of a plurality of injectors having persistent memory a different portion of said set of n key shares, wherein said different portion is less than k, and wherein said different portion includes at least one key share that said first injector did not receive from said controller;

assembling said encryption key using said portion stored in said persistent memory of said first injector and said different portion received from said other injector;

extracting said data portion from said message and encrypting said data portion using said assembled encryption key;

injecting said encrypted data portion into said blockchain;

receiving at said second injector a subsequent message inbound for said blockchain, said subsequent message containing a subsequent data portion; and encrypting said subsequent data portion using only key shares stored in said persistent memories of said plurality of injectors, wherein said encrypting of said subsequent data portion occurs even if said controller is temporarily unavailable, wherein each of said plurality of injectors can read said encrypted data portion, wherein each of said plurality of injectors stores less than k of said set of n key shares in said persistent memory, and wherein said encryption key is assembled without communicating with said controller.

12. The method of claim 11, wherein said encrypting step uses Advanced Encryption Standard protocol to encrypt said data portion.

13. The method of claim 11, said obtaining step comprising:

transmitting to a second injector in said plurality of injectors a request for a third portion of said set of n key shares; and receiving from said second injector said third portion, wherein said different portion comprises said third portion.

14. The method of claim 13, said obtaining step further comprising:

transmitting to a third injector in said plurality of injectors a request for a fourth portion of said set of n key shares; and receiving from said third injector said fourth portion, wherein said different portion comprises said fourth portion.

15. The method of claim 11, said obtaining step comprising:

transmitting to a second injector a request to transmit a third portion of said set of n key shares to a third injector;

transmitting to said third injector a request to combine said third portion with a fourth portion of said set of n key shares; and receiving from said third injector said third and fourth portions, wherein said different portion comprises said third and fourth portions.

\* \* \* \* \*